UNITED STATES PATENT OFFICE.

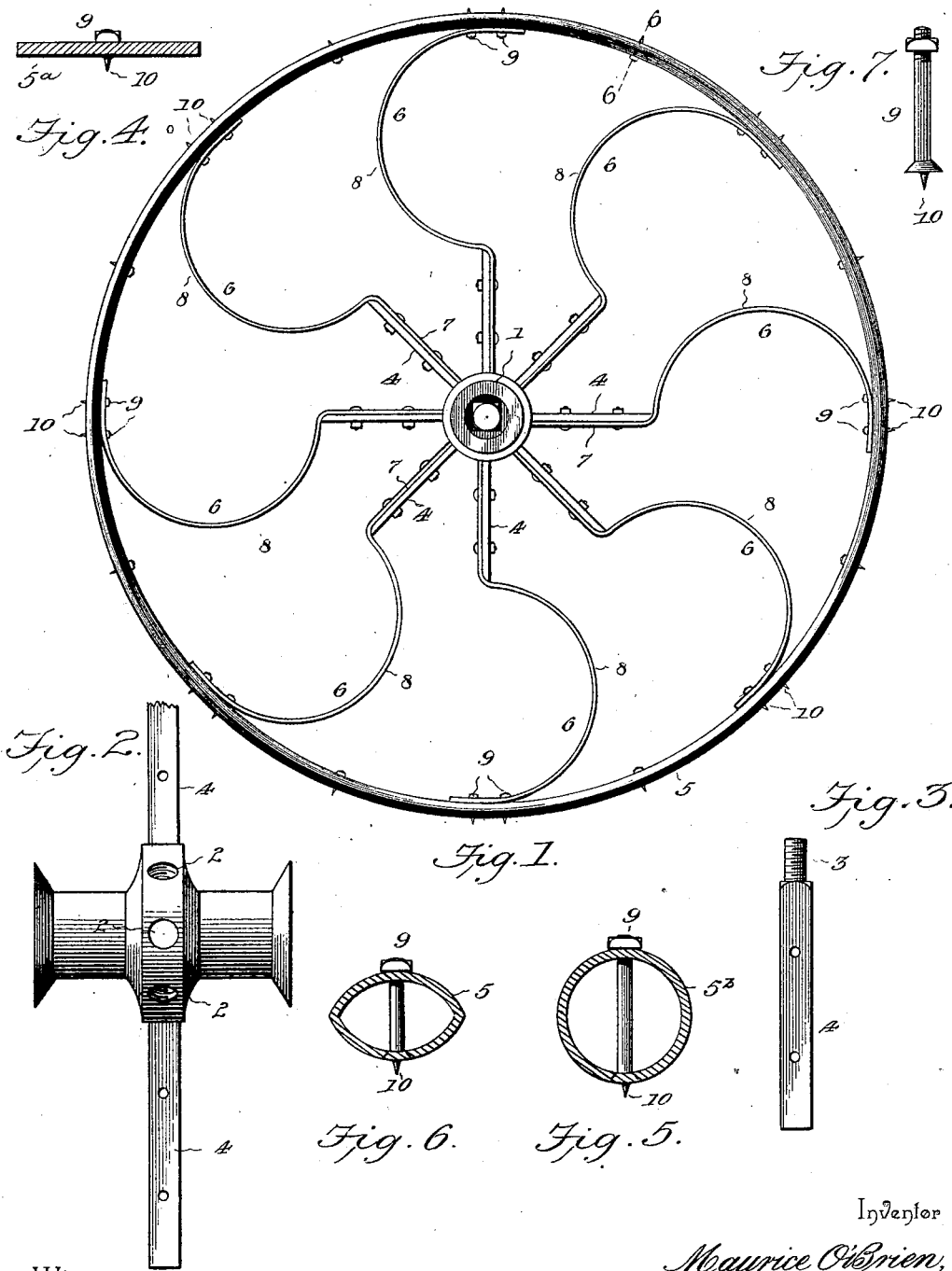

MAURICE O'BRIEN, OF FRESNO, CALIFORNIA.

SPRING-WHEEL.

SPECIFICATION forming part of Letters Patent No. 606,934, dated July 5, 1898.

Application filed November 30, 1897. Serial No. 660,238. (No model.)

*To all whom it may concern:*

Be it known that I, MAURICE O'BRIEN, a citizen of the United States, residing at Fresno, in the county of Fresno and State of California, have invented a new and useful Wheel, of which the following is a specification.

The invention relates to improvements in wheels.

The object of the present invention is to improve the construction of wheels and to provide a simple, strong, and durable one designed for bicycles and vehicles and adapted to dispense with pneumatic tires and springs for supporting the body of the vehicle.

The invention consists in the construction and novel combination and arrangement of parts, as hereinafter fully described, illustrated in the accompanying drawings, and pointed out in the claims hereto appended.

In the drawings, Figure 1 is a side elevation of a wheel constructed in accordance with this invention. Fig. 2 is a detail view of the hub and its arms. Fig. 3 is a similar view of one of the arms. Figs. 4 and 5 are detail views showing modified forms of rims. Fig. 6 is a sectional view on line 6 6 of Fig. 1. Fig. 7 is a detail view of one of the rim-bolts.

Like numerals of reference designate corresponding parts in all the figures of the drawings.

1 designates a hub provided with an annular series of threaded sockets 2, receiving threaded inner ends 3 of straight arms 4, which extend outward radially from the hub in the direction of the rim 5 of the wheel similar to the ordinary spokes. These straight arms 4, which extend outward nearly one-half the distance between the hub and the rim, serve as supports for springs 6 and may be varied in length to suit the springs and adapt the wheel to the particular vehicle or bicycle to which it is to be applied.

The springs 6, which extend from the hub to the rim, consist of straight inner portions 7 and regularly-curved outer portions 8, which are substantially semicircular and which extend across the outer ends of the arms 4, forming shoulders for the same, as clearly illustrated in Fig. 1 of the accompanying drawings. The outer ends of the arms 4 by abutting against the springs at their angles serve to support the same and prevent them from breaking at that point. The inner straight portion of each spring is bolted or otherwise secured to its arm 4, and the outer end of the curved portion 8 is perforated for the reception of rim-bolts 9, which pass through the rim 5, being provided at their outer ends with heads and having projecting spurs 10 extending therefrom to adapt the wheel for running on wet or frozen ground or ice and prevent it from slipping. The nuts of the rim-bolts are arranged within the wheel, as clearly shown in Fig. 1.

The rim 5, which is constructed of metal, is elliptical, presenting inner and outer convex faces to the springs and to the supporting-surface, and this form of rim, although constructed of metal, possesses some resiliency and serves as a slight cushion. Instead of making the metallic rim oval it may be constructed of flat metal or round tubular metal, as illustrated in Figs. 4 and 5 of the accompanying drawings. The flat rim $5^a$ and the round rim $5^b$ are designed to be attached to the springs in the manner heretofore described and may be provided with spurs, as shown.

The invention has the following advantages: The springs operate to cushion a bicycle-frame or vehicle-body, and thereby enable pneumatic tires and body-supporting springs to be dispensed with, and their arrangement is such that they mutually contribute to each other's support, so that no one spring is subjected to severe strain, and this, together with the particular arrangement of the springs on the short arms, produces a strong and durable wheel that is not liable to be broken. The springs may be varied in strength to adapt the wheel to various vehicles and bicycles, and the said wheel is prevented from slipping on wet or frozen ground or ice, and it is especially adapted for rough roads.

Changes in the form, proportion, and minor details of construction may be resorted to without departing from the spirit or sacrificing any of the advantages of this invention, such as constructing the steel springs of flat, oval, or other shaped metal, changing the curve of the same, and varying the number of the springs and the arms.

What I claim is—

1. A wheel comprising a rim, a hub, short radial arms extending from the hub and terminating short of the rim, and springs secured to the arms and to the rim and having curved outer portions, said springs forming shoulders or angles at the outer ends of the arms and resting against and supported by the same, substantially as and for the purpose described.

2. A wheel comprising a hub, a rim, radial arms extending from the hub and terminating short of the rim, and the springs comprising straight inner portions secured to the arms and the regularly-curved substantially semicircular outer portions fastened to the rim, the curved and straight portions of the springs forming angles or shoulders and fitting against the outer ends of the arms, substantially as and for the purpose described.

3. A wheel comprising a hub, radial arms extending therefrom, a hollow metallic rim elliptical in cross-section and presenting an outer convex face, and springs connecting the arms and the rim, substantially as described.

4. A wheel comprising a hub, radial arms extending therefrom, a hollow metallic rim elliptical in cross-section and presenting an outer convex face, springs connecting the arms and the rim, and fastening devices passing through the outer ends of the springs and the rim and provided with spurs projecting from the outer convex face of the rim, substantially as described.

In testimony that I claim the foregoing as my own I have hereto affixed my signature in the presence of two witnesses.

MAURICE O'BRIEN.

Witnesses:
THOMAS DUNN,
MARCELLUS REYNOLDS.